United States Patent [19] McCague, Sr. et al.

[11] 4,162,101
[45] Jul. 24, 1979

[54] WALKER FOR INVALID PERSONS

[76] Inventors: John E. McCague, Sr.; Elinor M. McCague, both of 3236 E. Lester, Tucson, Ariz. 85716

[21] Appl. No.: 831,373

[22] Filed: Sep. 8, 1977

[51] Int. Cl.[2] ........................ F16M 13/08; A61H 3/00

[52] U.S. Cl. ........................................... 297/6; 135/67; 272/70.3; 297/332

[58] Field of Search ................. 135/67; 297/5, 6, 332, 297/335; 272/70.3

[56] References Cited

U.S. PATENT DOCUMENTS

| | | | |
|---|---|---|---|
| 673,100 | 4/1901 | Tyler | 297/5 |
| 1,104,615 | 7/1914 | Braden | 297/332 X |
| 1,210,518 | 1/1917 | Nolan | 297/332 |
| 1,448,783 | 3/1923 | Blewitt | 135/67 X |
| 2,776,701 | 1/1957 | Denis | 297/6 |
| 2,798,533 | 7/1957 | Frank | 135/67 X |
| 3,354,893 | 11/1967 | Schmerl | 135/67 |
| 3,633,906 | 1/1972 | Fowler | 272/70.3 |
| 3,993,349 | 11/1976 | Neufeld | 135/67 X |

FOREIGN PATENT DOCUMENTS

| | | | |
|---|---|---|---|
| 328446 | 8/1935 | Italy | 297/332 |
| 197129 | 5/1923 | United Kingdom | 297/332 |

*Primary Examiner*—C. J. Husar
*Assistant Examiner*—Conrad Berman
*Attorney, Agent, or Firm*—J. Michael McClanahan

[57] ABSTRACT

A walker for invalid persons is described having a three sided frame structure permitting an invalid patient to lift the structure, place it in a forward position, and then walk into the cavity of the structure and also providing means for seating the party interiorly to the frame structure with seat means that automatically swings up and out of the way when seating is not desired.

1 Claim, 3 Drawing Figures

WALKER FOR INVALID PERSONS

BACKGROUND OF INVENTION

It has been found useful to provide handicapped or invalid persons support means by which they may recover ambulatory movements where support in excess of that provided by a cane or crutch is necessary, generally support which might be had from a stable platform and which may be grasped by both hands. To that end, there have been various types of so called walkers or other invalid support devices which have generally provided a light weight frame structure which the invalid person may lift or push forward, grasp for support, and walk to the new position gained by the movement of the device. In particular, patents have been granted various individuals for support devices, for example, Newfeld et al., U.S. Pat. No. 3,993,349 discloses a frame structure with a back supporting attachment; Blewitt et al., U.S. Pat. No. 1,448,783 discloses a support device mounted on rollers and having a seat; Tyler, U.S. Pat. No. 673,100 shows a walking chair having a permanent seat built in; Schmerl, U.S. Pat. No. 3,354,893 showing a collapsable walker frame structure having a seat; Frank, U.S. Pat. No. 2,798,533 also shows a walker frame structure having a seat attached thereto; and finally Fowler, U.S. Pat. No. 3,633,906 discloses a walker with rocking movement comprising a frame structure with a permanent seat built thereon.

SUMMARY OF INVENTION

The invention disclosed comprises in vertical section a generally u-shaped light weight frame structure providing supoort to invalid persons while walking combining features of non-skid rubber feet, rubber hand grips, and a seat situated interiorly to the u-shaped central area where means are provided for automatically pivoting or swinging the seat out of the central area of the "U" when the seat is not being used. Tension springs means working with a lever means set off from the seat at a rear point raises the seat to a vertical position out of the walker interior portion when the interior central portion is needed for the patient's walking movements.

Accordingly, an object of the described invention is to provide a u-shaped frame structured walker providing means for automatically withdrawing the seat to a position out of the way when not used.

Further, it is a another object to provide a frame structured light weight walker providing seating means where the seating means are withdrawn to a position out of the way by spring and lever means.

DETAILED DESCRIPTION

Figure 1:
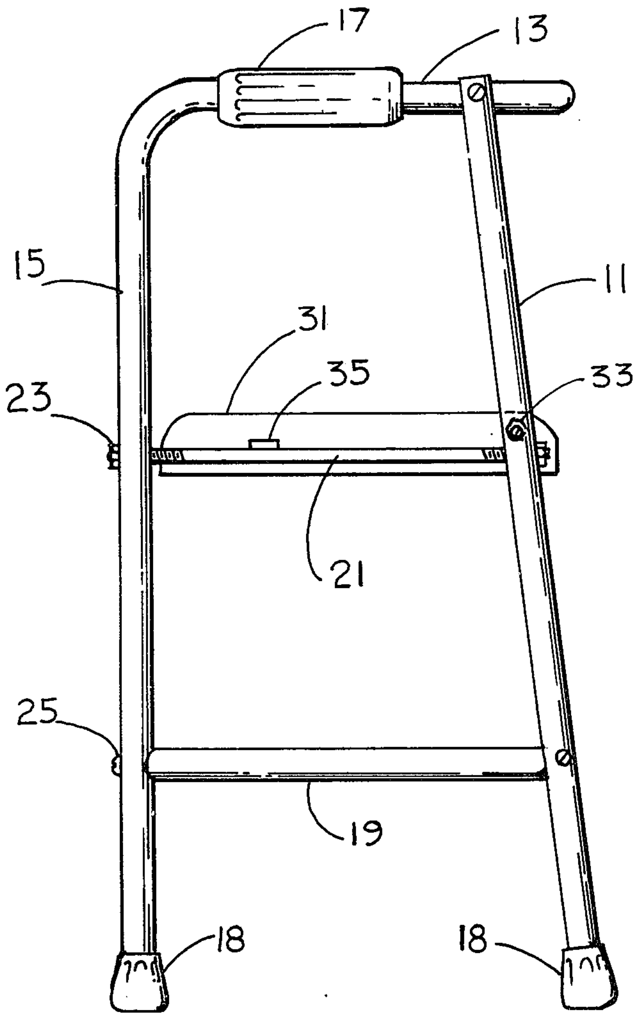
FIG. 1 is a right sided view of the preferred embodiment of the inventive walker.

Referring now to FIG. 1, a side view of the inventive walker showing the frame structure, preferrably formed from aluminum tubing which is used in substantial portion of the invention. More specifically, right forward leg structure 11 is joined at its upper distal end by right support arm 13 while the lower distal end of right forward leg structure 11 is in contact with the floor or ground. Right support arm 13 forms an intergral part of the frame structure comprising in addition, the right rear support leg 15 which also rest upon the floor or gouund. Rubber grip 17 surrounds a portion of the right support arm 13 and is provided for the patient or invalid person to grab. Surrounding and attached to the lower ends of right forward leg structure 11 and right rear support leg 15 are rubber feet 18 to provide non-skid qualities to the walker in addition to preventing the open ends of the frame structure from digging into the floor or ground.

Connected between the right rear support leg 15 and the right forward leg structure 11 is right lower cross member 19 and right upper cross member 21 which provide rigidity to the right hand side of the inventive walker frame structure. Right lower cross member 19 comprises the same type of tubing, preferrably aluminum, which makes up the leg structures 11 and 15, whereas the right upper cross member, in the preferred embodiment, is nominally a steel rod, threaded on both ends which passes through openings in the right forward leg structure 11, and right rear support leg 15 and secured with nuts 23 against the frame structure. Right lower cross member 19, is the right handed portion of a U-shaped structure which joins the right hand side of the invention and left hand side of the invention (not shown) and is held in place by means of machine screws which penetrate through the side of right forward leg structure 11 and right lower cross 19 to be capped by a nut which is not shown. Right lower cross member 19 is attached to right rear support leg 15 by means of a machine screw which penetrates the wall of right rear support leg 15 to engage a plug interiorly to right lower cross member 19. The plug in turn has a hole interior to if which is threaded to receive the machine screw 25.

Integral to the invention is the pivotal seat member 31 which pivots about bolt 33 attached to right forward leg structure 11. Pivotal seat member 31 is spring loaded which when not in use, swings seat 31 to an upper position parallel to right forward leg structure 11. When seat member 31 is down, such as shown in FIG. 1., tab 35 attached to seat 31 engages right upper cross member 21 to limit the downward travel of seat 31 and to provide resting support for the seat if the invalid person sits on same. In the seat's upward at rest position, so placed there by the springs shown in a later figure, tab 35 engages the right forward leg structure 11 and thereby limits the upward travel of seat 31.

Figure 2:
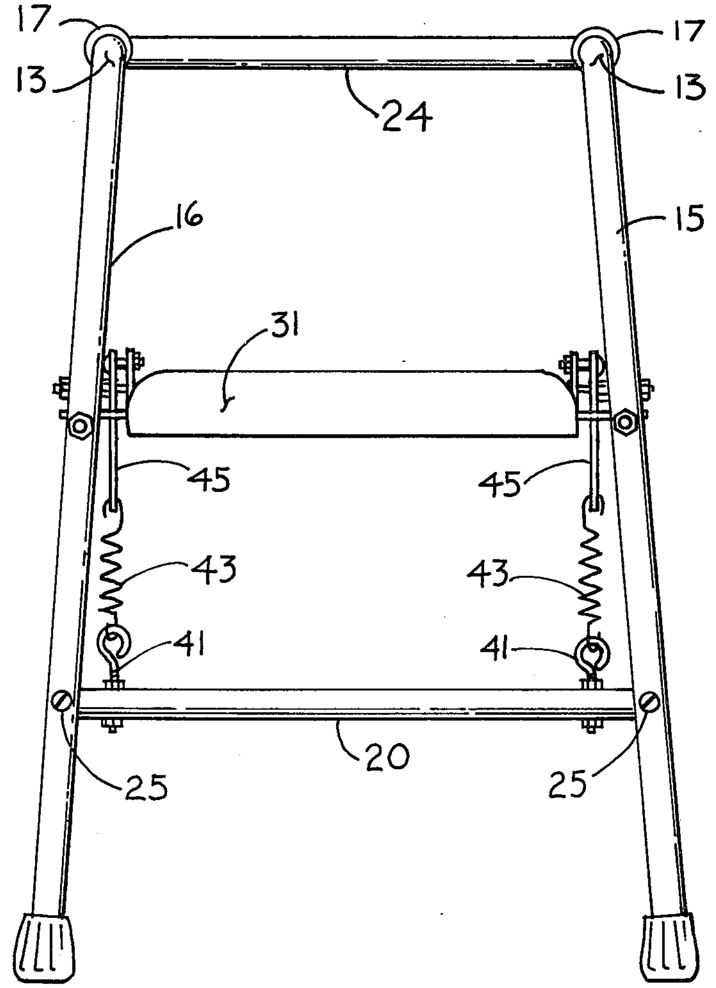
FIG. 2 is a rear view of the preferred embodiment of the inventive walker.

Reference is now made to FIG. 2, which is a rear view of the inventive walker. Specifically, right rear support leg 15 together with its mate, left rear support leg 16 is shown on opposite sides of the figure together with the rear support leg crossover member 24 which joins to becomes the ends of the upper support arms comprising right support arm 13 and left support arm 14. In addition, partial end views of rubber grips 17 are shown. As is obvious from views shown in FIG. 1 and FIG. 2, for cost reduction and ease of manufacturing, the metal tubing which comprises both rear support legs 15 and 16, both support arms 13 and 14, and rear support leg crossover member 24 are preferrably made from one continuous piece of metal having necessary turns and twists formed in the metal at the junctions of the legs with the arms, and the arms with the crossover member. This may be easily accomplished through the use of a bending jig or other type of bending device.

Additionally shown in FIG. 2 is the continuation of the right lower cross member 19, which was shown in FIG. 1, namely central lower cross member 20 which joins the right front leg structure 11 (not shown) with the left front leg structure (not shown). Machine screws 25 which join right lower cross member 19 and its left counterpart are additionally shown in FIG. 2.

Figure 3:
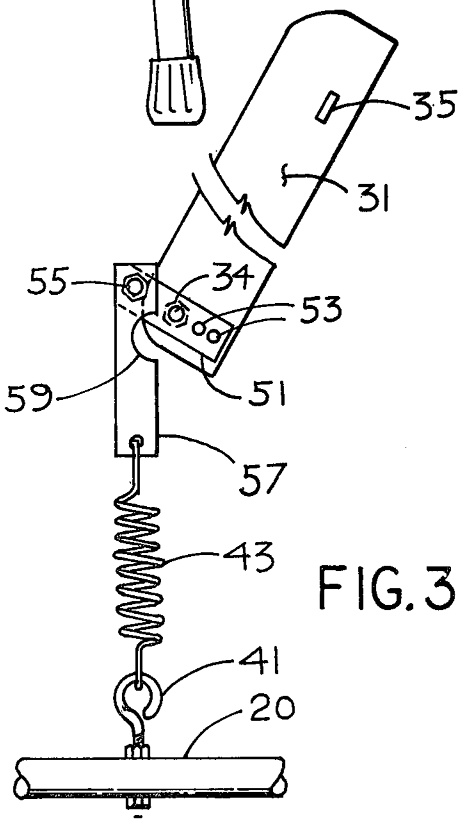
FIG. 3 is an enlarged view of the spring-lever mechanism for automatically pivoting the seat to an upward out of the way position when not being used.

The mechanism which pivots seat member 31 to the upward position when not in use is shown in FIG.2 comprising eye bolts 41 penetrating and attached to central lower cross member 20 having tension springs 43 connecting the eye of the eyebolts 41 and lever arm 45 which in turn connects with the seat 31 pivotal mechanism which is illustrated in more detail in FIG. 3.

Referring now to FIG. 3 the spring actuated mechanism which keeps seat member 31 in the vertical position when it is not being used is shown in more detail by removal of the left forward leg structure. Attached to seat 31 in fixed relationship is structural member 51 which is held to the seat by screw means 53 or any other similar means of attaching the member to seat 31. Thereafter, structural member 51, at its end distal to the screw means 53, attaches to bolt means 55 which also connects spring extension means 57 permitting the rotational connection of structural member 51 and spring extension means 57. Attached to spring extension means 57 in turn, is tension springs 43 with, itself, is also attached to eyebolt 41 connected to central lower cross member 20.

When seat 31 is not being used by the invalid person, spring 43 pulls spring extension means 57 downward, which, in combination with connecting bolt means 55, rotates strutural member 51 about seat pivotal axle 34, a part of bolt 33 (FIG. 1), which penetrates the forward leg structure (not shown). It is noted that there is a semi circle cut 59 in spring extension member 57 in order that when seat member 31 is in its horizontal position and spring extension member 57 has moved into a position paralleling or nearly paralleling structural member 51, the spring extension member 57 does not engage the seat pivotal axle 34.

As shown in FIG. 2, there are the spring and seat lifting mechanism on both side of the seat for more positive return even though only one would be necessary.

While the frame structure which has been defined has preferrably been described of light weight aluminum tubing, it is realized that any light weight material possessing structural integrity may be used such as plastic, woods, or any other light weight metal material.

In using the preferred embodiment of the invention, an invalid person will take hold of the rubber grips 17 on both sides of the walker and, since the seat in the normal rest position is vertical, the invalid party may occupy the cavity formed by the two sides and front of the walker. As the walker is designed to be of light weight it is picked up by the invalid person and moved forward and set down on the floor. Then the person, with arms out-stretched, will walk to the cavity formed by the two sides and the front, stop, and then repeat the operation of lifting the walker forward and walking again to it. This is done in a series of relatively short steps, but with practice, may become quite rapid. Rubber feet 18 provide the necessary traction with the floor to avoid any sliding of the walker feet.

When the invalid person has reached a point where they wish to rest, or if they were performing work such as washing dishes, at a sink they would merely turn the walker around in the direction opposite to which they wish to face, pull the seat down, and sit upon it. After their work is done, the party merely needs to raise up, move out of the cavity , and the seat returns automatically to its upright position. The walker is then turned around and the party proceeds to walk as detailed earlier.

It is noted that in the preferred embodiment of the walker, the seat is located at a position which is normally higher than the average chair seat height to avoid for the invalid party the trouble and hardship of lowering themselves, and raising themselves, to the normal chair seat height. Here, the seat is elevated such that the invalid person need only lower themself a short distance and subsequently raise themself a short distance. As a result, this elevates the sitting invalid person to a height where they may conveniently work at the usual kitchen sink top heights or to perform other normal functions at this height.

While a preferred embodiment of the invention has been described and shown, it is not intended that these embodiments limit the invention but that the invention only be limited by the appended claim.

We claim:

1. A walker for invalid persons comprising a right side, a left side, a front side, and seat means interiorly to said right, left, and front sides; said left side and said right side each comprising an "A" frame structure having two spaced apart upright members and at least two horizontal members; said front side comprising one member each of said right side and said left side upright members and at least two horizontal members, said horizontal members attached to said left side and right side upright members; said seat means including a seat, upright lever means attached at right angles to said seat and on opposite sides thereon between said seat and said left and right side upright member, a plurity of stops, and pivotal means, said pivotal means attached to said upright lever means and said front side means; and spring means operably attached to said upright lever means, said spring means including a spring and elongated spring extension means, said spring attached at one end to one of said front side horizontal members and at the other end to one end of said elongated spring extension means, the other end of said spring extension means attached to said upright lever means, said spring extension means defining elongated metal means having an arcuate portion cut therefrom, said arcuate portion arranged to surround on one side said seat pivotal means; said stops engaging said front side vertical members when said seat is in a upright vertical position and said stops engaging said left side and said right side horizontal members when said seat is in a horizontal position; and said left side and right side vertical members are provided with rubber feet and said left side and right side cross-member is provided with rubber grips whereby when said seat is down, said upright lever, the spring means, and pivotal means are in a substantially straight vertical line and when said seat is not being used and pivots upward, it will be substantially in line with the fron siade interiorly to said right, left and front sides and provide maximum interior space for the person walking to walk in.

* * * * *